(12) United States Patent
Hisai

(10) Patent No.: US 12,007,017 B1
(45) Date of Patent: Jun. 11, 2024

(54) PLANETARY GEAR DEVICE AND ACTUATOR

(71) Applicant: Enplas Corporation, Saitama (JP)

(72) Inventor: Koki Hisai, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 18/084,598

(22) Filed: Dec. 20, 2022

(51) Int. Cl.
*F16H 57/08* (2006.01)
*F16H 57/00* (2012.01)

(52) U.S. Cl.
CPC ....... *F16H 57/082* (2013.01); *F16H 57/0025* (2013.01); *F16H 2200/2005* (2013.01)

(58) Field of Classification Search
CPC ............... F16H 57/082; F16H 57/0025; F16H 2200/2005
See application file for complete search history.

(56) References Cited

U.S. PATENT DOCUMENTS

| | | | |
|---|---|---|---|
| 11,808,247 B2 * | 11/2023 | Hoelzl | F16H 57/0471 |
| 2023/0193980 A1 * | 6/2023 | Kaneko | F16H 1/2818 74/640 |

FOREIGN PATENT DOCUMENTS

| | | | |
|---|---|---|---|
| DE | 102019123264 A1 * | 3/2021 | |
| JP | 2007-040396 | 2/2007 | |

* cited by examiner

*Primary Examiner* — Tinh Dang

(57) ABSTRACT

A planetary gear device include: a carrier portion including a first facing portion and a second facing portion that face with each other; a planetary portion disposed between the first facing portion and the second facing portion; and a first supporting portion and a second supporting portion formed on the first facing portion and the second facing portion or the planetary portion, respectively, and cooperating with each other so as to support the planetary portion rotatably on the second facing portion.

11 Claims, 8 Drawing Sheets

ONE SIDE OF AXIAL DIRECTION ⟵    ⟶ OTHER SIDE OF AXIAL DIRECTION

ONE SIDE OF AXIAL DIRECTION ⟵ ⟶ OTHER SIDE OF AXIAL DIRECTION

ONE SIDE OF AXIAL DIRECTION ⟵ ⟶ OTHER SIDE OF AXIAL DIRECTION

ONE SIDE OF AXIAL DIRECTION ⟵ ⟶ OTHER SIDE OF AXIAL DIRECTION

ONE SIDE OF AXIAL DIRECTION ⟵ ⟶ OTHER SIDE OF AXIAL DIRECTION

ONE SIDE OF AXIAL DIRECTION ⟵ ⟶ OTHER SIDE OF AXIAL DIRECTION

ONE SIDE OF AXIAL DIRECTION ⟵ ⟶ OTHER SIDE OF AXIAL DIRECTION

ONE SIDE OF AXIAL DIRECTION ←——— ———→ OTHER SIDE OF AXIAL DIRECTION

ONE SIDE OF AXIAL DIRECTION ←——— ———→ OTHER SIDE OF AXIAL DIRECTION

PLANETARY GEAR DEVICE AND ACTUATOR

BACKGROUND ART

The planetary gear device is used for various mechanical devices such as automobiles and robots as a speed reducer that decelerates the input rotation and outputs the decelerated rotation (see Patent Literature (hereinafter, referred to as PTL) 1).

PTL 1 discloses a planetary gear device that decelerates the rotation of a motor and transmits the rotation to an output shaft. Such a planetary gear device includes a plurality of planetary gears and a carrier that rotatably supports the plurality of planetary gears.

CITATION LIST

Patent Literature

PTL 1
Japanese Patent Application Laid-Open No. 2007-40396

SUMMARY OF INVENTION

Technical Problem

Incidentally, in the case of the planetary gear device disclosed in PTL 1, each of the plurality of planetary gears is supported by a carrier with a relatively long single planetary shaft. In such a configuration, a relatively large moment acts on a planetary shaft based on an external force acting on the planetary shaft in use. Such a moment may cause damage to the planetary shaft. Thus, there is a possibility that the durability of the planetary gear device deteriorates.

An object of the present invention is to provide a planetary gear device and an actuator each having high durability.

Solution to Problem

One aspect of an planetary gear device according to the present invention includes: a carrier portion including a first facing portion and a second facing portion that face with each other; a planetary portion disposed between the first facing portion and the second facing portion; and a first supporting portion and a second supporting portion formed on the first facing portion and the second facing portion or the planetary portion, respectively, and cooperating with each other so as to support the planetary portion rotatably on the second facing portion.

One aspect of the actuator according to the present invention includes a planetary gear device having the above-described configuration, and a motor connected to the planetary gear device and driving the planetary gear device.

Advantageous Effects of Invention

According to the present invention, a planetary gear device and an actuator having high durability can be provided.

DESCRIPTION OF EMBODIMENTS

Hereinafter, embodiments of the present invention will be described with reference to the drawings.

Embodiment 1

Figure 1:
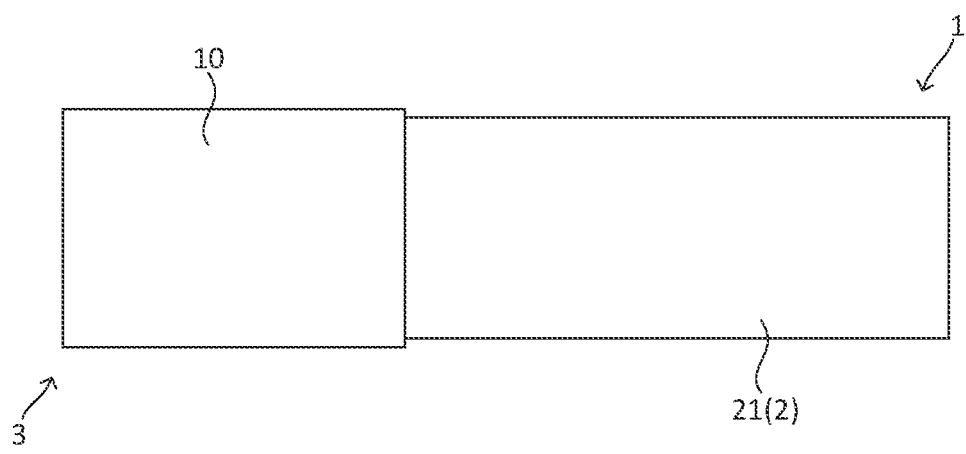
FIG. 1 is a side view of an actuator according to Embodiment 1 of the present invention.
Figure 2A:
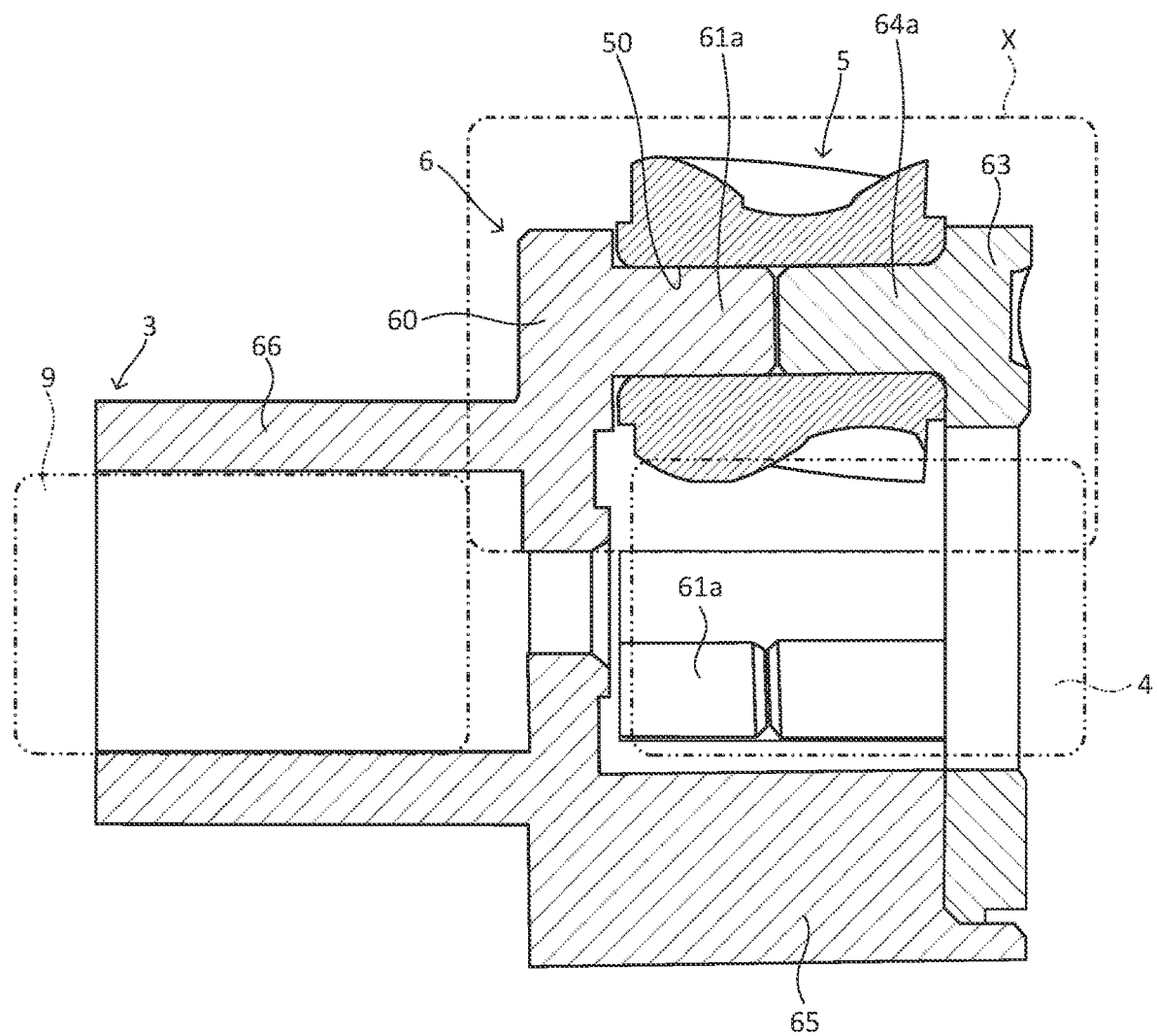
FIG. 2A is a cross-sectional view of a planetary gear device.

FIG. 1 is a side view of actuator 1 according to Embodiment 1 of the present invention. FIG. 2A is a cross-sectional view of planetary gear device 3.

Planetary gear device 3 and actuator 1 according to the present embodiment are merely examples of the planetary gear device and the actuator according to the present invention, and the present invention is not limited by the embodiments to be described below.

In the following description, a left-right direction in FIGS. 1 and 2A is referred to as an axial direction. Further, the left direction in FIGS. 1 and 2A is referred to as one side in the axial direction (hereinafter, referred to as one side of the axial direction), and the right direction is referred to as the other side in the axial direction (hereinafter, referred to as the other side of the axial direction). The axial direction means the axial direction of actuator 1 and each member configuring actuator 1, unless otherwise specified.

Furthermore, a direction orthogonal to the axial direction in FIGS. 1 and 2A is referred to as a radial direction. The radial direction means the radial direction of actuator 1 and each member configuring actuator 1, unless otherwise specified.

The outer side in the radial direction (hereinafter, referred to as a radially outer side) means a direction away from the center of actuator 1 and each member configuring actuator 1 in the radial direction.

On the other hand, the inner side in the radial direction (hereinafter, referred to as a radially inner side) means a direction approaching the center of actuator 1 and each member configuring actuator 1 in the radial direction.

Further, in FIGS. 1 and 2A, a direction around a central axis of actuator 1 parallel to the axial direction is referred to as a circumferential direction. The circumferential direction means the circumferential direction of actuator 1 and each member configuring actuator 1, unless otherwise specified.

Hereinafter, actuator 1 according to the present embodiment will be described with reference to FIGS. 1 and 2A.

Actuator 1 is used, for example, as an actuator of an electric back door for an automobile or an electric curtain. However, the application of actuator 1 is not particularly limited.

Actuator 1 includes electric motor 2 and planetary gear device 3 connected to electric motor 2.

Electric motor 2 includes motor body 21 and a rotation shaft (not illustrated). Electric motor 2 operates under the control of a control unit (not illustrated), and drives planetary gear device 3 by rotating the rotation shaft. Note that the electric motor is not limited to any particular type and may be an electric motor of various types known in the art.

Planetary gear device 3 decelerates the rotation input from electric motor 2 at a predetermined reduction ratio, and transmits the rotation to output shaft 9.

Planetary gear device 3 is housed in housing 10 (see FIG. 1). Planetary gear device 3 decelerates the rotation transmitted from electric motor 2 and transmits the rotation to output shaft 9 (see FIG. 2A). Output shaft 9 is fixed to output-side shaft portion 66 of carrier portion 6, which will be described later.

Planetary gear device 3 includes sun gear 4, a plurality of (in the present embodiment, three) planetary portions 5, and carrier portion 6.

Sun gear 4 is a cylindrical external gear, and is fixed to a rotation shaft (not illustrated) of electric motor 2. Specifically, sun gear 4 includes a sun tooth portion on the outer peripheral surface. The sun tooth portion includes helical teeth formed as though by cutting obliquely with respect to the central axis of sun gear 4.

That is, sun gear 4 is a helical gear and an external gear. Examples of the material of sun gear 4 include a metal or a synthetic resin. Note that sun gear 4 may include teeth parallel to the central axis of sun gear 4.

Planetary portions 5 are each an external gear (also referred to as a planetary gear), and rotatably supported by carrier portion 6. Planetary portions 5 are arranged at equal intervals in the circumferential direction in a space between first side-plate portion 60 and second side-plate portion 63 of carrier portion 6, which will be described later. In the present embodiment, planetary gear device 3 includes three planetary portions 5. Note that, in FIG. 2A, only one planetary portion 5 is illustrated for convenience of description.

Planetary portions 5 each include a planetary tooth portion on the outer peripheral surface. The planetary tooth portion includes helical teeth formed as though by cutting obliquely with respect to the central axis of planetary portion 5. That is, planetary portions are each a helical gear and an external gear.

Note that planetary portion 5 may include teeth parallel to the central axis of planetary portion 5. That is, planetary portion 5 may be a spur gear and an external gear.

Planetary portion 5 includes planetary-side receiving portion 50 formed of a through-hole extending in the axial direction. Planetary-side receiving portion 50 opens through one end surface (also referred to as the first end surface) and the other end surface (also referred to as the second end surface) in the axial direction of planetary portion 5. Examples of the material of planetary portion 5 include a metal or a synthetic resin. Planetary-side receiving portion 50 corresponds to an example of the first planetary-side receiving portion and the second planetary-side receiving portion.

The planetary tooth portion of planetary portion 5 meshes with the sun tooth portion of sun gear 4 and the internal teeth (not illustrated) of the internal gear (not illustrated). Note that the internal gear is provided so as to surround planetary gear device 3. The internal gear may be provided, for example, on an inner peripheral surface of housing 10 (see FIG. 1) that houses planetary gear device 3. Further, the teeth of the internal gear can be appropriately selected in accordance with the shape of the teeth of planetary portion 5.

Planetary portion 5 rotates (rotates on its own axis) around its central axis based on the rotation of sun gear 4. Further, planetary portion 5 rotates (revolves) around sun gear 4 based on its own rotation and the meshing with the first internal gear (not illustrated). Note that the central axis of revolution of planetary portion 5 corresponds with the central axis of sun gear 4.

Carrier portion 6 supports planetary portion 5 rotatably (so as to rotate on its own axis). Carrier portion 6 rotates based on the revolution of planetary portion 5. Such carrier portion 6 is a member for positioning planetary portion 5 and sun gear 4, and positioning planetary portion 5 and the internal gear (not illustrated).

Specifically, carrier portion 6 includes first side-plate portion 60, second side-plate portion 63, a plurality of connecting portions 65, and output-side shaft portion 66.

First side-plate portion 60 corresponds to an example of the first facing portion and has a disk shape. First side-plate portion 60 faces second side-plate portion 63 in the axial direction. First side-plate portion 60 includes first supporting portions 61a at a plurality of positions (three positions in the present embodiment) on the first side surface (the surface facing second side-plate portion 63) in the axial direction.

First supporting portions 61a are provided at equal intervals in the circumferential direction (intervals of 120 degrees in the present embodiment). First supporting portions 61a are each a shaft member extending from the first side surface of first side-plate portion 60 toward second side-plate portion 63. The length of first supporting portion 61a is slightly shorter than half the distance between the first side surface of first side-plate portion 60 and the first side surface of second side-plate portion 63 (the surface facing first side-plate portion 60).

In the present embodiment, the second side surface (in other words, the side surface on one side in the axial direction) of first side-plate portion 60 is a circular flat surface. Therefore, it is possible to secure a large sliding contact area of the second side surface of first side-plate portion 60 and a member (e.g., a part of housing 10) slidably contacting with the second side surface.

Note that the length of the first supporting portion is not limited to the length of first supporting portion 61a in the present embodiment. The length of the first supporting portion may be appropriately set in relation to the length of the second supporting portion, which will be described later.

First supporting portions 61a each support planetary portion 5 rotatably on first side-plate portion 60. First supporting portions 61a are each inserted into planetary-side receiving portion 50 of planetary portion 5 from one side in the axial direction. The outer peripheral surface of first supporting portion 61a and the inner peripheral surface of planetary-side receiving portion 50 slidably contact with each other.

Note that, in the present embodiment, first supporting portion 61a is formed of a member integral with first side-plate portion 60. However, the first supporting portion may be formed of a member separate from the first side-plate portion (that is, the first facing portion). When the first supporting portion is formed of a member separate from the first side-plate portion, the first supporting portion may be fixed to the first side-plate portion by fastening means (e.g., fitting or adhesion).

Second side-plate portion 63 corresponds to an example of the second facing portion and has a circular plate shape. Second side-plate portion 63 is provided on the other side from first side-plate portion 60 in the axial direction. Sun gear 4 is disposed in a central hole of second side-plate portion 63.

Note that, in the present embodiment, first side-plate portion 60 corresponds to an example of the first facing portion, and second side-plate portion 63 corresponds to an example of the second facing portion. However, it can also be considered that first side-plate portion 60 corresponds to an example of the second facing portion, and second side-plate portion 63 corresponds to an example of the first facing portion.

In other words, it can be considered that a side-plate portion on one side of the pair of side-plate portions (first side-plate portion 60 and second side-plate portion 63) in the carrier portion corresponds to an example of the first facing portion, and a side-plate portion on the other side corresponds to an example of the second facing portion.

Second side-plate portion 63 faces first side-plate portion 60, having a predetermined distance in the axial direction. Second side-plate portion 63 includes second supporting portions 64a at a plurality of positions (three positions in the present embodiment) on the first side surface (the surface facing first side-plate portion 60) in the axial direction.

Second supporting portions 64a are provided at equal intervals in the circumferential direction (intervals of 120 degrees in the present embodiment). Second supporting portions 64a are each a shaft member extending from the first side surface of second side-plate portion 63 toward first side-plate portion 60. First supporting portion 61a and second supporting portion 64a are provided concentrically on the same line.

The length of second supporting portion 64a is slightly shorter than half the distance between the first side surface of first side-plate portion 60 and the first side surface of second side-plate portion 63. In the present embodiment, a slight gap is provided between a tip end surface of first supporting portion 61a and a tip end surface of second supporting portion 64a. Lubricating oil or grease may be put in the gap.

Note that the length of the second supporting portion is not limited to the length of second supporting portion 64a in the present embodiment. The length of the second supporting portion may be appropriately set in relation to the length of the first supporting portion. For example, the second supporting portion may be shorter or longer than the first supporting portion. The distance between the tip end surface of the first supporting portion and the tip end surface of the second supporting portion may also be set as appropriate.

Second supporting portions 64a each support planetary portion 5 rotatably on second side-plate portion 63. Second supporting portions 64a are each inserted into planetary-side receiving portion 50 of planetary portion 5 from the other side in the axial direction. The outer peripheral surface of second supporting portion 64a and the inner peripheral surface of planetary-side receiving portion 50 slidably contact with each other.

Note that, in the present embodiment, second supporting portion 64a is formed of a member integral with second side-plate portion 63. However, the second supporting portion may be formed of a member separate from the second side-plate portion (that is, the second facing portion). When the second supporting portion is formed of a member separate from the second side-plate portion, the second supporting portion may be fixed to the second side-plate portion by fastening means (e.g., fitting or adhesion).

As described above, in the present embodiment, first supporting portion 61a is provided to first side-plate portion 60, and second supporting portion 64a is provided to second side-plate portion 63. That is, first supporting portion 61a and second supporting portion 64a are provided in carrier portion 6.

The plurality of (in the present embodiment, three) connecting portions 65 have axial shapes extending in the axial direction, and connect first side-plate portion 60 and second side-plate portion 63 together in the axial direction. The plurality of connecting portions 65 are provided at equal intervals (intervals of 120 degrees) in the circumferential direction.

The plurality of connecting portions 65 are provided between first supporting portions 61a (second supporting portions 64a) adjacent to each other in the circumferential direction. Between connecting portions 65 adjacent to each other in the circumferential direction, planetary portion 5 is disposed.

Output-side shaft portion 66 is a cylindrical member, and is a member for supporting carrier portion 6, for example, on housing 10 (see FIG. 1). Specifically, output-side shaft portion 66 is provided to a central portion of a second side surface (in other words, a side surface on one side in the axial direction) of first side-plate portion 60.

The central axis of output-side shaft portion 66 corresponds with the central axis of planetary gear device 3. For example, output-side shaft portion 66 is rotatably supported by housing 10 (see FIG. 1).

Output-side shaft portion 66 includes a female spline portion on the inner peripheral surface. Output shaft 9 is inserted into output-side shaft portion 66. Then, the male spline portion formed on the outer peripheral surface of output shaft 9 and the female spline portion of output-side shaft portion 66 are engaged with each other. Thus, output shaft 9 is rotatable together with carrier portion 6.

In planetary gear device 3 according to the present embodiment having the above-described configuration, planetary portions 5 are each supported rotatably on carrier portion 6 by first supporting portion 61a and second supporting portion 64a provided in carrier portion 6.

In this state, planetary portion 5 is rotatable (can rotate on its own axis) around its own central axis and rotatable (revolvable) around the central axis of sun gear 4.

Hereinafter, the operation, function, and effect of actuator 1 will be described. First, when electric motor 2 is operated, an output shaft (not illustrated) of electric motor 2 rotates in the first direction or the second direction. Hereinafter, a case where the output shaft of electric motor 2 rotates in the first direction will be described.

When the output shaft of electric motor 2 rotates in the first direction, sun gear 4 rotates in the first direction together with the output shaft of electric motor 2. Next, based on the rotation of sun gear 4, planetary portions 5 each rotate (rotate on its own axis) in the second direction around its own central axis.

Alternatively, planetary portion 5 rotates (revolves) in the first direction around the rotation center axis of sun gear 4 based on the rotation of planetary portion 5 and the meshing of planetary portion 5 and the internal gear (not illustrated). Further, as planetary portion 5 revolves, carrier portion 6 rotates (rotates on its own axis) in the first direction around its own central axis. The rotation of carrier portion 6 is transmitted to a rotation shaft engaged with output-side shaft portion 66 of carrier portion 6.

In planetary gear device 3 of the present embodiment having the above-described configuration, planetary portion 5 is supported by first supporting portion 61*a* and second supporting portion 64*a* provided in carrier portion 6. That is, planetary portion 5 is supported by relatively short first supporting portion 61*a* and second supporting portion 64*a*. Therefore, compared to a configuration in which the planetary portion is supported by one relatively long planetary shaft, generation of a large moment on first supporting portion 61*a* and second supporting portion 64*a* can be reduced. As a result, planetary gear device 3 with high durability can be provided.

[Additional Remark]

Figure 2B:
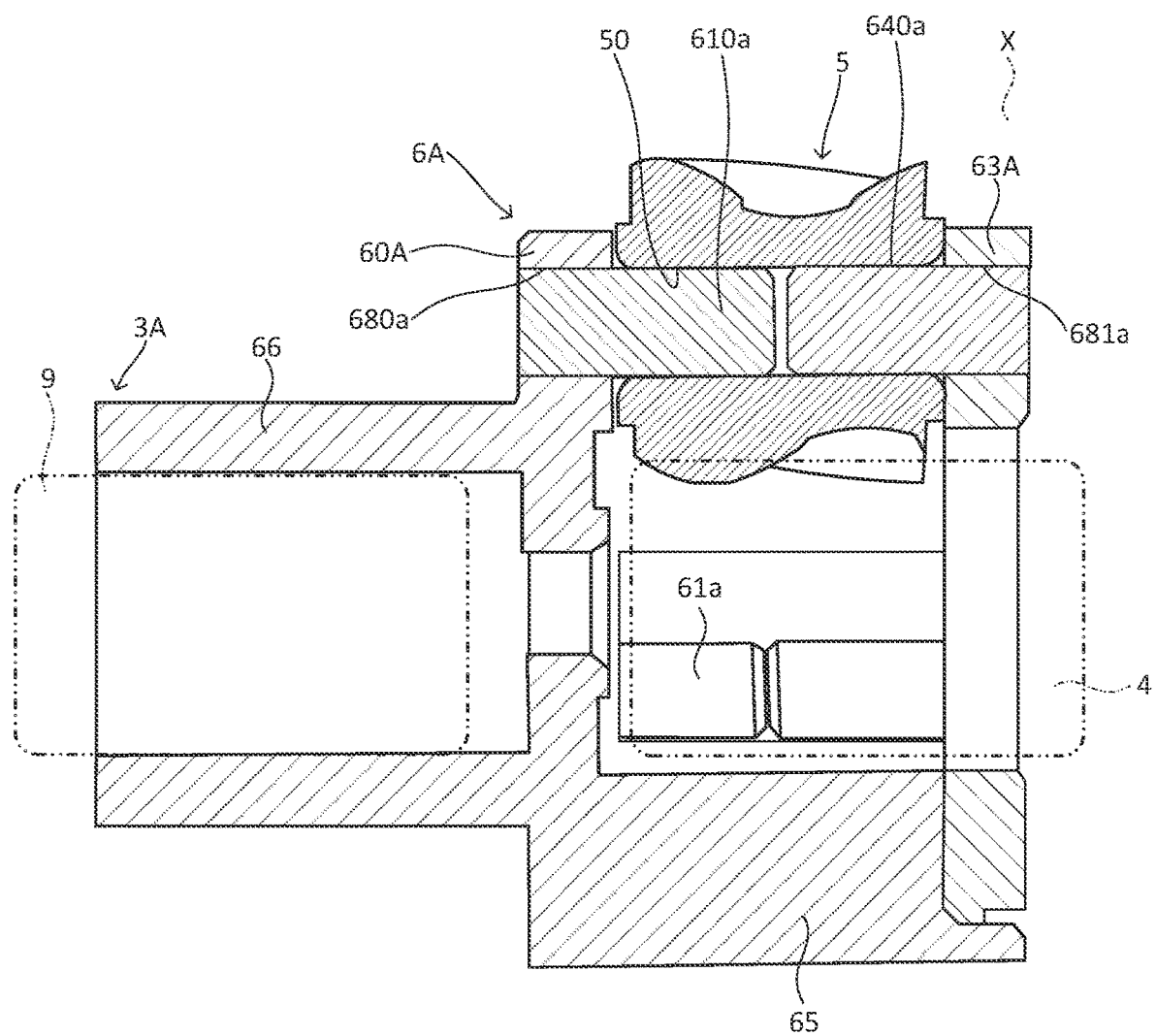
FIG. 2B is a cross-sectional view of a variation of the planetary gear device according to Embodiment 1.

FIG. 2B is a cross-sectional view of a variation of planetary gear device 3 according to the present embodiment. In planetary gear device 3A illustrated in FIG. 2B, first supporting portion 610*a* of carrier portion 6A is formed of a member separate from first side-plate portion 60A. Further, second supporting portion 640*a* of carrier portion 6A is formed of a member separate from second side-plate portion 63A.

Then, first supporting portion 610*a* is inserted into first bearing hole 680*a* provided in first side-plate portion 60A. First supporting portion 610*a* is fitted to first supporting hole 680*a* in a non-rotatable state.

Further, second supporting portion 640*a* is inserted into second bearing hole 681*a* provided in second side-plate portion 63A. Second supporting portion 640*a* is fitted to second supporting hole 681*a* in a non-rotatable state. Other configurations of planetary gear device 3A are the same as those of planetary gear device 3 according to Embodiment 1. Thus, among members illustrated in FIG. 2B, the same members as those illustrated in FIG. 2A are denoted by the same reference numerals.

Embodiment 2

Figure 3:
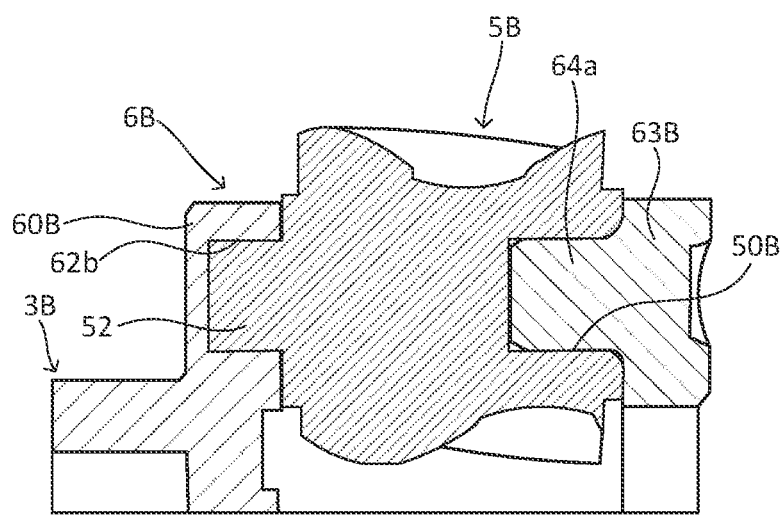
FIG. 3 is a partial cross-sectional view of a planetary gear device according to Embodiment 2 of the present invention, which corresponds to section X in FIG. 2A.

FIG. 3 is a partial cross-sectional view of planetary gear device 3B according to Embodiment 2 of the present invention. In planetary gear device 3B according to the present embodiment, the configuration of planetary portion 5B and carrier portion 6B is different from the configuration of planetary portion 5 and carrier portion 6 of planetary gear device 3 according to above-described Embodiment 1.

Hereinafter, the configuration different from the configuration of planetary gear device 3 according to above-described Embodiment 1 will be mainly described for the configuration of planetary gear device 3B according to the present embodiment. Configurations other than planetary portion 5B and carrier portion 6B are the same as those of planetary gear device 3 according to above-described Embodiment 1. For configurations other than planetary portion 5B and carrier part 6B, the description of above-described Embodiment 1 may be used as appropriate. Further, the same reference numerals are given to the members common to the Embodiments.

Planetary portions 5B are each an external gear (also referred to as a planetary gear), and is rotatably supported by carrier portion 6B. Planetary portions 5B are arranged at equal intervals in the circumferential direction in a space between first side-plate portion 60B and second side-plate portion 63B of carrier portion 6B, which will be described later.

Planetary portions 5B each include a planetary tooth portion on the outer peripheral surface. The planetary tooth portion includes helical teeth formed as though by cutting obliquely with respect to the central axis of planetary portion 5B. That is, planetary portions 5B are each a helical gear and an external gear. Note that planetary portion 5B may include teeth parallel to the central axis of planetary portion 5B. That is, planetary portion 5B may be a spur gear and an external gear.

Planetary portion 5B includes planetary-side supporting portion 52 on an end surface facing first side-plate portion 60B (also referred to as a first end surface). Planetary-side supporting portion 52 corresponds to an example of the second supporting portion, and is a shaft member extending from a first end surface of planetary portion 5B to one side in the axial direction.

Planetary portion 5B includes planetary-side receiving portion 50B on an end surface facing second side-plate portion 63B (also referred to as a second end surface). Planetary-side receiving portion 50B is formed of a recessed portion provided on the second end surface of planetary portion 5B. Planetary-side receiving portion 50B includes a cylindrical inner surface whose inner diameter does not change.

The dimension of depth of planetary-side receiving portion 50B is smaller than half the distance in the axial direction between the first end surface and the second end surface of planetary portion 5B. Other configurations of planetary portion 5B are the same as those of planetary portion 5 according to Embodiment 1.

Carrier portion 6B includes first side-plate portion 60B, second side-plate portion 63B, a plurality of connecting portions 65 (see FIG. 2A), and output-side shaft portion 66 (see FIG. 2A). The configurations of the plurality of connecting portions 65 and output-side shaft portion 66 are the same as the configurations of the plurality of connecting portions 65 and output-side shaft portion 66 in Embodiment 1.

First side-plate portion 60B corresponds to an example of the second facing portion and has a disk shape. First side-plate portion 60B faces second side-plate portion 63B in the axial direction. First side-plate portion 60B includes carrier-side receiving portions 62*b* at a plurality of positions (three positions in the present embodiment) in the circumferential direction.

Carrier-side receiving portions 62*b* rotatably supports planetary-side supporting portion 52. Carrier-side receiving portions 62*b* are provided at equal intervals in the circumferential direction (intervals of 120 degrees in the present embodiment). Specifically, carrier-side receiving portions 62*b* is formed of a recessed portion that opens to the first side surface (the surface facing second side-plate portion 63B) in the axial direction. Note that carrier-side receiving portion 62*b* may be formed of a through-hole that penetrates first side-plate portion 60B in the axial direction.

Planetary-side supporting portion 52 is inserted into carrier-side receiving portion 62*b* from the other side in the axial direction. The inner peripheral surface of carrier-side receiving portion 62*b* and the outer peripheral surface of planetary-side supporting portion 52 slidably contact with each other.

Second side-plate portion 63B corresponds to an example of the first facing portion and has a circular plate shape. Second side-plate portion 63B is provided on the other side from first side-plate portion 60B in the axial direction. Sun gear 4 (see FIG. 2A) is disposed in a central hole of second side-plate portion 63B.

Second side-plate portion 63B includes carrier-side supporting portions 64a at a plurality of positions (three positions in the present embodiment) on the first side surface (the surface facing first side-plate portion 60B) in the axial direction. Second supporting portions 64a are provided at equal intervals in the circumferential direction (intervals of 120 degrees in the present embodiment). Such a configuration of second side-plate portion 63B is the same as the configuration of second side-plate portion 63 in Embodiment 1.

Carrier-side supporting portions 64a each correspond to an example of the first supporting portion, and support planetary portion 5B rotatably on second side-plate portion 63B. Carrier-side supporting portions 64a are each inserted into planetary-side receiving portion 50B of planetary portion 5B from the other side in the axial direction. The outer peripheral surface of carrier-side supporting portion 64a and the inner peripheral surface of planetary-side receiving portion 50B slidably contact with each other.

As described above, in the present embodiment, planetary-side supporting portion 52, which is the first supporting portion, is provided to planetary portion 5B. Meanwhile, carrier-side supporting portion 64a is provided to second side-plate portion 63B. That is, carrier-side supporting portion 64a is provided to carrier portion 6B.

In the present embodiment having the above-described configuration, planetary portion 5B is supported by planetary-side supporting portion 52 provided to planetary portion 5B and carrier-side supporting portion 64a provided to carrier portion 6B. That is, in the present embodiment, planetary portion 5B is also supported by relatively short planetary-side supporting portion 52 and carrier-side supporting portion 64a. Therefore, compared to a configuration in which the planetary portion is supported by one relatively long planetary shaft, generation of a large moment on planetary-side supporting portion 52 and carrier-side supporting portion 64a can be reduced. As a result, planetary gear device 3B with high durability can be provided. Other configurations, operations, and advantages of planetary gear device 3B are the same as those of above-described Embodiment 1.

Embodiment 3

Figure 4:
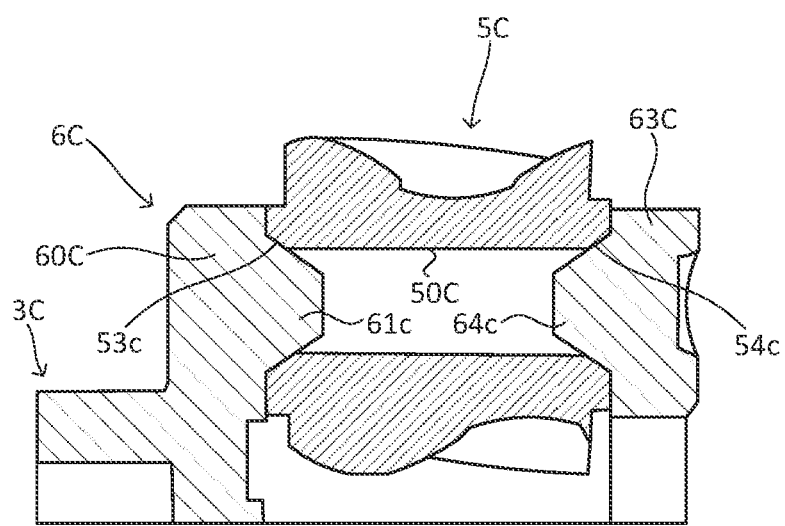
FIG. 4 is a partial cross-sectional view of a planetary gear device according to Embodiment 3 of the present invention.

FIG. 4 is a partial cross-sectional view of planetary gear device 3C according to Embodiment 3 of the present invention. In planetary gear device 3C according to the present embodiment, the configuration of planetary portion 5C and carrier portion 6C is different from the configuration of planetary portion 5 and carrier portion 6 of planetary gear device 3 according to above-described Embodiment 1.

Hereinafter, the configuration different from the configuration of planetary gear device 3 according to above-described Embodiment 1 will be mainly described for the configuration of planetary gear device 3C according to the present embodiment. Configurations other than planetary portion 5C and carrier portion 6C are the same as those of planetary gear device 3 according to above-described Embodiment 1. For configurations other than planetary part 5C and carrier part 6C, the description of above-described Embodiment 1 may be used as appropriate.

Planetary portions 5C are each an external gear (also referred to as a planetary gear), and are rotatably supported by carrier portion 6C. Planetary portions 5C are arranged at equal intervals in the circumferential direction in a space between first side-plate portion 60C and second side-plate portion 63C of carrier portion 6C, which will be described later.

Planetary portions 5C each include a planetary tooth portion on the outer peripheral surface. The planetary tooth portion includes helical teeth formed as though by cutting obliquely with respect to the central axis of planetary portion 5C. That is, planetary portions 5C are each a helical gear and an external gear. Note that planetary portion 5C may include teeth parallel to the central axis of planetary portion 5C. That is, planetary portion 5C may be a spur gear and an external gear.

Planetary portion 5C includes planetary-side receiving portion 50C formed of a through-hole extending in the axial direction. Planetary-side receiving portion 50C opens through one end surface (in other words, the first end surface) and the other end surface (in other words, the second end surface) in the axial direction of planetary portion 5C.

Further, in the present embodiment, planetary portion 5C includes first planetary-side receiving portion 53c at an edge (also referred to as the first edge portion) on a side close to first side-plate portion 60C in planetary-side receiving portion 50C. First planetary-side receiving portion 53c is formed over the entire circumference of the first edge of planetary-side receiving portion 50C. That is, first planetary-side receiving portion 53c is formed of a ring-shaped conical surface.

Further, in the present embodiment, planetary portion 5C includes second planetary-side receiving portion 54c at an edge (also referred to as the second edge portion) on a side close to second side-plate portion 63C in planetary-side receiving portion 50C. Second planetary-side receiving portion 54c is formed over the entire circumference of the second edge of planetary-side receiving portion 50. That is, second planetary-side receiving portion 54c is formed of a ring-shaped conical surface. Other configurations of planetary portion 5C are substantially the same as those of planetary portion 5 according to Embodiment 1.

Carrier portion 6C includes first side-plate portion 60C, second side-plate portion 63C, a plurality of connecting portions 65 (see FIG. 2A), and output-side shaft portion 66 (see FIG. 2A). The configurations of the plurality of connecting portions 65 and output-side shaft portion 66 are the same as the configurations of the plurality of connecting portions 65 and output-side shaft portion 66 in Embodiment 1.

First side-plate portion 60C corresponds to an example of the first facing portion and has a disk shape. First side-plate portion 60C faces second side-plate portion 63C in the axial direction. First side-plate portion 60C includes first supporting portions 61c at a plurality of positions (three positions in the present embodiment) on the first side surface (the surface facing second side-plate portion 63C) in the axial direction.

First supporting portions 61c are provided at equal intervals in the circumferential direction (intervals of 120 degrees in the present embodiment). First supporting portions 61c are each a protruding portion extending from the first side surface of first side-plate portion 60C toward second side-plate portion 63C.

Specifically, first supporting portion 61c is formed of a member integral with first side-plate portion 60C. First supporting portion 61c is a protruding portion having a truncated cone-shape whose outer diameter decreases toward second side-plate portion 63C. Thus, first supporting portion 61c includes an outer peripheral surface having a truncated cone-shape.

In the present embodiment, the length of first supporting portion 61c is shorter than half the distance between the first side surface of first side-plate portion 60C and the first side surface (the surface facing first side-plate portion 60C) of second side-plate portion 63C. As described in FIG. 4, the length of first supporting portion 61c in the axial direction in the present embodiment is shorter than the length of first supporting portion 61a (see FIG. 2A) in the axial direction in Embodiment 1.

First supporting portions 61c having the above-described configuration each support planetary portion 5C rotatably on first side-plate portion 60C. First supporting portions 61c are each inserted into planetary-side receiving portion 50 of planetary portion 5C from one side in the axial direction.

The outer peripheral surface of first supporting portion 61c and first planetary-side receiving portion 53c of planetary portion 5C slidably contact with each other. Note that the contact condition between the outer peripheral surface of first supporting portion 61c and first planetary-side receiving portion 53c of planetary portion 5C is a surface contact.

Note that, in the present embodiment, first supporting portion 61c is formed of a member integral with first side-plate portion 60C. However, the first supporting portion may be formed of a member separate from the first side-plate portion (that is, the first facing portion). When the first supporting portion is formed of a member separate from the first side-plate portion, the first supporting portion may be fixed to the first side-plate portion by fastening means (e.g., fitting or adhesion).

Second side-plate portion 63C corresponds to an example of the second facing portion and has a circular plate shape. Second side-plate portion 63C is provided on the other side from first side-plate portion 60C in the axial direction. Sun gear 4 (see FIG. 2A) is disposed in a central hole of second side-plate portion 63C.

Second side-plate portion 63C includes second supporting portions 64c at a plurality of positions (three positions in the present embodiment) on the first side surface (the surface facing first side-plate portion 60C) in the axial direction. Second supporting portions 64c are provided at equal intervals in the circumferential direction (intervals of 120 degrees in the present embodiment).

Second supporting portions 64c are each a protruding portion extending from the first side surface of second side-plate portion 63C toward first side-plate portion 60C.

Specifically, second supporting portion 64c is formed of a member integral with second side-plate portion 63C. Second supporting portion 64c is a protruding portion having a truncated cone-shape whose outer diameter decreases toward first side-plate portion 60C. Second supporting portion 64c includes an outer peripheral surface having a truncated cone-shape.

In the present embodiment, the length of second supporting portion 64c is shorter than half the distance between the first side surface of first side-plate portion 60C and the first side surface (the surface facing first side-plate portion 60C) of second side-plate portion 63C. As described in FIG. 4, the length of second supporting portion 64c in the axial direction in the present embodiment is shorter than the length of second supporting portion 64a (see FIG. 2A) in the axial direction in Embodiment 1.

Second supporting portions 64c having the above-described configuration each support planetary portion 5C rotatably on second side-plate portion 63C. Second supporting portions 64c are each inserted into planetary-side receiving portion 50 of planetary portion 5C from the other side in the axial direction.

The outer peripheral surface of second supporting portion 64c and second planetary-side receiving portion 54c of planetary portion 5C slidably contact with each other. Note that the contact condition between the outer peripheral surface of second supporting portion 64c and second planetary-side receiving portion 54c of planetary portion 5C is a surface contact.

Note that, in the present embodiment, second supporting portion 64c is formed of a member integral with second side-plate portion 63C. However, the second supporting portion may be formed of a member separate from the second side-plate portion (that is, the second facing portion). When the second supporting portion is formed of a member separate from the second side-plate portion, the second supporting portion may be fixed to the second side-plate portion by fastening means (e.g., fitting or adhesion).

In the present embodiment having the above-described configuration, planetary portion 5C is supported by first supporting portion 61c and second supporting portion 64c provided in carrier portion 6C. In other words, in the present embodiment, Each of the configurations (lengths and shapes) of first supporting portion 61c and second supporting portion 64c is not a configuration capable of supporting planetary portion alone. That is, first supporting portion 61c and second supporting portion 64c cooperate with each other to rotatably support planetary portion 5C.

In this embodiment, first supporting portion 61c and second supporting portion 64c are formed of short protruding portions. Therefore, generation of a large moment on first supporting portion 61c and second supporting portion 64c in use can be reduced. As a result, planetary gear device 3C with high durability can be provided.

Further, in the present embodiment, the outer peripheral surface of first supporting portion 61c and second supporting portion 64c are conical surfaces. Furthermore, first planetary-side receiving portion 53c and second planetary-side receiving portion 54c of planetary portion 5C are each formed of a conical surface. Therefore, the alignment performance of planetary portion 5C in use can be enhanced. Other configurations, operations, and advantages of planetary gear device 3C are the same as those of above-described Embodiment 1.

Figure 5:
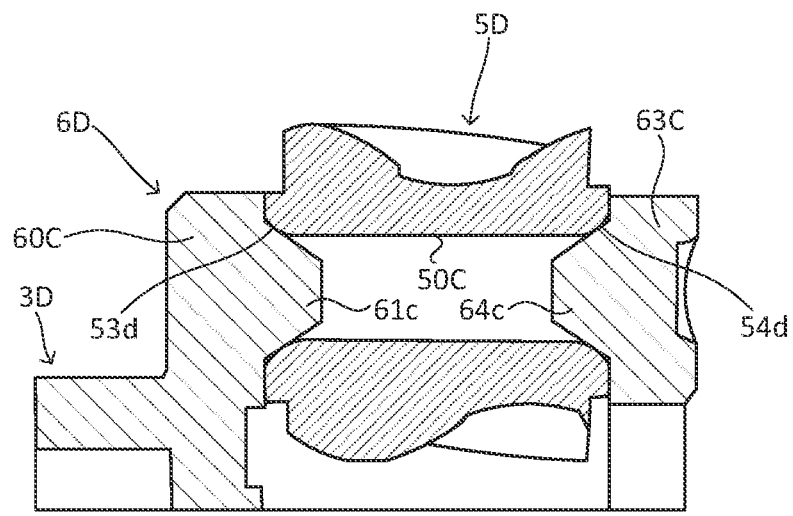
FIG. 5 is a partial cross-sectional view of a variation of the planetary gear device according to Embodiment 3.

Note that FIG. 5 is a partial cross-sectional view of planetary gear device 3D according to an exemplary variation of the present embodiment. As illustrated in FIG. 5, first planetary-side receiving portion 53d and second planetary-side receiving portion 54d of planetary portion 5D are each formed of a ring-shaped protruding surface whose cross-sectional shape is a protruding curved surface. The configuration of carrier portion 6D is the same as the configuration of carrier portion 6C in Embodiment 3.

First planetary-side receiving portion 53d of planetary portion 5D slidably contacts with the outer peripheral surface of first supporting portion 61c. Note that the contact condition between first planetary-side receiving portion 53d of planetary portion 5D and the outer peripheral surface of first supporting portion 61c is a line contact.

Further, second planetary-side receiving portion 54d of planetary portion 5D slidably contacts with the outer peripheral surface of second supporting portion 64c. Note that the contact condition between second planetary-side receiving portion 54d of planetary portion 5D and the outer peripheral surface of second supporting portion 64c is a line contact.

Highly durable planetary gear device 3D can be provided with such a variation as well. Further, according to the present variation, the alignment performance of planetary portion 5C in use can be enhanced.

Embodiment 4

Figure 6:
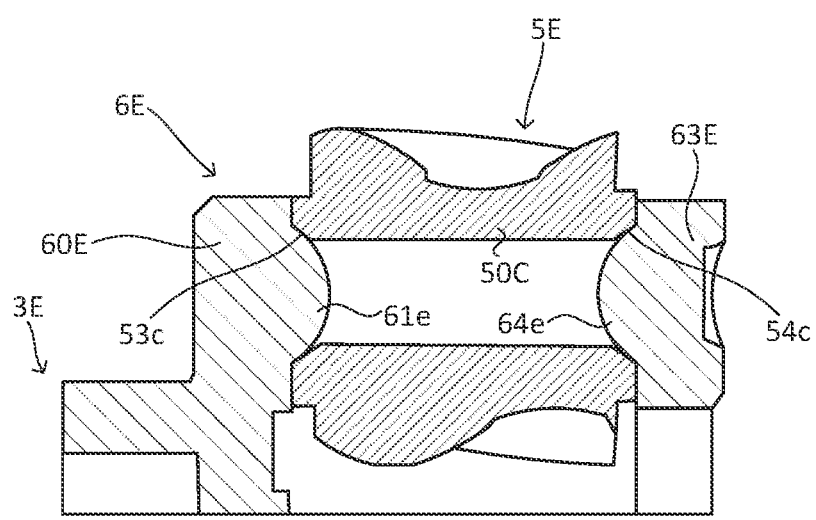
FIG. 6 is a partial cross-sectional view of a planetary gear device according to Embodiment 4 of the present invention.

FIG. 6 is a partial cross-sectional view of planetary gear device 3E according to Embodiment 4 of the present invention. In planetary gear device 3E according to the present embodiment, the configuration of planetary portion 5E and carrier portion 6E is different from the configuration of planetary portion 5 and carrier portion 6 of planetary gear device 3 according to above-described Embodiment 1. Note that the configuration of planetary portion 5E is the same as that of planetary portion 5D according to above-described Embodiment 3.

Hereinafter, the configuration different from the configurations of planetary gear devices 3 and 3C according to above-described Embodiment 1 and Embodiment 3 will be mainly described for the configuration of planetary gear device 3E according to the present embodiment. Because the configurations other than planetary portion 5E and carrier portion 6E are the same as those of planetary gear device 3 according to above-described Embodiment 1, the description of above-described Embodiment 1 may be used as appropriate.

Carrier portion 6E includes first side-plate portion 60E, second side-plate portion 63E, a plurality of connecting portions 65 (see FIG. 2A), and output-side shaft portion 66 (see FIG. 2A). The configurations of the plurality of connecting portions 65 and output-side shaft portion 66 are the same as the configurations of the plurality of connecting portions 65 and output-side shaft portion 66 in Embodiment 1.

First side-plate portion 60E corresponds to an example of the first facing portion and has a disk shape. First side-plate portion 60E faces second side-plate portion 63E in the axial direction. First side-plate portion 60E includes first supporting portions 61e at a plurality of positions (three positions in the present embodiment) on the first side surface (the surface facing second side-plate portion 63E) in the axial direction.

First supporting portions 61e are provided at equal intervals in the circumferential direction (intervals of 120 degrees in the present embodiment). First supporting portions 61e are each a hemispherical protruding portion extending from the first side surface of first side-plate portion 60E toward second side-plate portion 63E. That is, the outer surface of first supporting portion 61e is a spherical surface.

In the present embodiment, the length of first supporting portion 61e in the axial direction is shorter than half the distance between the first side surface of first side-plate portion 60E and the first side surface (the surface facing first side-plate portion 60E) of second side-plate portion 63E. First supporting portion 61e is formed of a member integral with first side-plate portion 60E.

First supporting portions 61e having the above-described configuration each support planetary portion 5E rotatably on first side-plate portion 60E. First supporting portions 61e are each inserted into planetary-side receiving portion 50C of planetary portion 5E from one side in the axial direction.

The outer surface of first supporting portion 61e and first planetary-side receiving portion 53c of planetary portion 5E slidably contact with each other. Note that the contact condition between the outer surface of first supporting portion 61e and first planetary-side receiving portion 53c of planetary portion 5E is a line contact. First planetary-side receiving portion 53c of planetary portion 5C is a ring-shaped conical surface.

Note that, in the present embodiment, first supporting portion 61e is formed of a member integral with first side-plate portion 60E. However, the first supporting portion may be formed of a member separate from the first side-plate portion (that is, the first facing portion). When the first supporting portion is formed of a member separate from the first side-plate portion, the first supporting portion may be fixed to the first side-plate portion by fastening means (e.g., fitting or adhesion).

Second side-plate portion 63E corresponds to an example of the second facing portion and has a circular plate shape. Second side-plate portion 63E is provided on the other side from first side-plate portion 60E in the axial direction. Sun gear 4 (see FIG. 2A) is disposed in a central hole of second side-plate portion 63E.

Second side-plate portion 63E includes second supporting portions 64e at a plurality of positions (three positions in the present embodiment) on the first side surface (the surface facing first side-plate portion 60E) in the axial direction. Second supporting portions 64e are provided at equal intervals in the circumferential direction (intervals of 120 degrees in the present embodiment).

Second supporting portions 64e are each a hemispherical protruding portion extending from the first side surface of second side-plate portion 63E toward first side-plate portion 60E. That is, the outer surface of second supporting portion 64e is a spherical surface.

In the present embodiment, the length of second supporting portion 64e in the axial direction is shorter than half the distance between the first side surface of first side-plate portion 60E and the first side surface (the surface facing first side-plate portion 60E) of second side-plate portion 63E. Second supporting portion 64e is formed of a member integral with second side planetary portion 63E.

Second supporting portions 64e having the above-described configuration each support planetary portion 5E rotatably on second side-plate portion 63E. Second supporting portions 64e are each inserted into planetary-side receiving portion 50C of planetary portion 5E from the other side in the axial direction.

The outer surface of second supporting portion 64e and second planetary-side receiving portion 54c of planetary portion 5E slidably contact with each other. Note that the contact condition between the outer surface of second supporting portion 64e and second planetary-side receiving portion 54c of planetary portion 5E is a line contact. Second planetary-side receiving portion 54c of planetary portion 5E is a ring-shaped conical surface.

Note that, in the present embodiment, second supporting portion 64e is formed of a member integral with second side-plate portion 63E. However, the second supporting portion may be formed of a member separate from the second side-plate portion (that is, the second facing portion). When the second supporting portion is formed of a member separate from the second side-plate portion, the second supporting portion may be fixed to the second side-plate portion by fastening means (e.g., fitting or adhesion).

According to the present embodiment having the above-described configuration, planetary portion 5E is supported by first supporting portion 61e and second supporting portion 64e provided in carrier portion 6E. In particular, in the present embodiment, first supporting portion 61e and second supporting portion 64e are each formed of a hemispherical protruding portion having a short length in the axial direction. Therefore, generation of a large moment on first supporting portion 61e and second supporting portion 64e in use can be reduced. As a result, planetary gear device 3E with high durability can be provided.

Further, in the present embodiment, the outer surfaces of first supporting portion 61e and second supporting portion 64e are spherical surfaces. Furthermore, first planetary-side receiving portion 53c and second planetary-side receiving portion 54c of planetary portion 5E are each formed of a conical surface. Thus, the alignment performance of planetary portion 5E in use can be enhanced. Other configurations, operations, and advantages of planetary gear device 3E are the same as those of above-described Embodiment 1.

Figure 7:
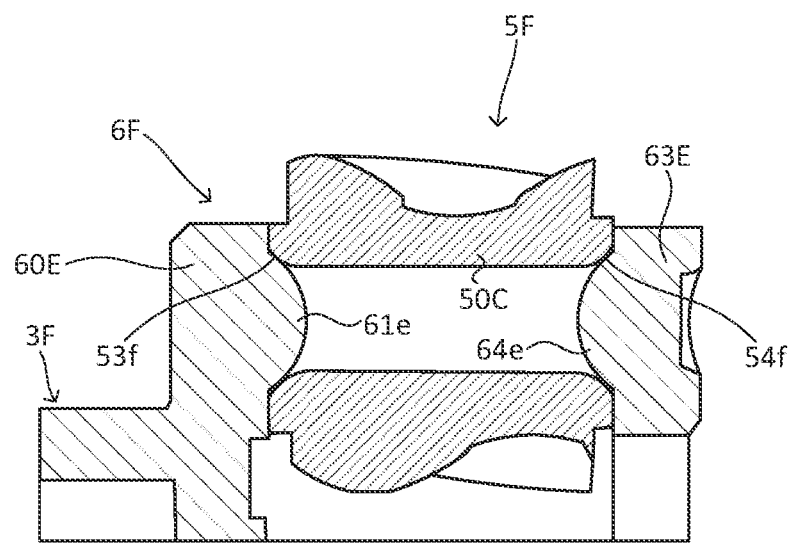
FIG. 7 is a partial cross-sectional view of a variation of the planetary gear device according to Embodiment 4.

Note that FIG. 7 is a partial cross-sectional view of planetary gear device 3F according to an exemplary variation of the present embodiment. As illustrated in FIG. 7, first planetary-side receiving portion 53f and second planetary-side receiving portion 54f of planetary portion 5F are each formed of a ring-shaped protruding surface whose cross-sectional shape is a protruding curved surface. The configuration of carrier portion 6F is the same as the configuration of carrier portion 6D and 6E in Embodiment 3 and Embodiment 4.

First planetary-side receiving portion 53f of planetary portion 5F slidably contacts with the outer surface of first supporting portion 61e. Note that the contact between first planetary-side receiving portion 53f of planetary portion 5F and the outer surface of first supporting portion 61e is a line contact.

Further, second planetary-side receiving portion 54f of planetary portion 5F slidably contacts with the outer surface of second supporting portion 64e. Note that the contact between second planetary-side receiving portion 54f of planetary portion 5F and the outer surface of second supporting portion 64e is a line contact.

Highly durable planetary gear device 3F can be provided by such a variation as well. Further, according to the present variation, the alignment performance of planetary portion 5F in use can be enhanced.

Figure 8A:
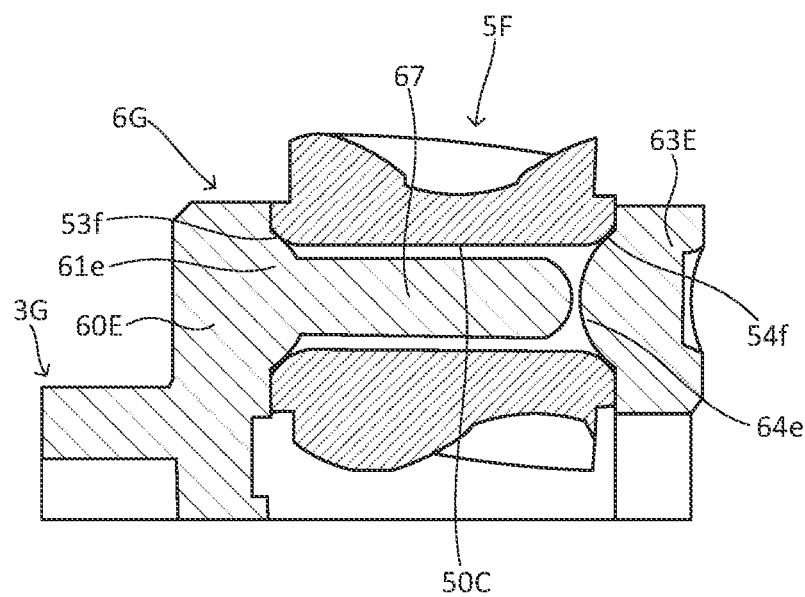
FIG. 8A is a partial cross-sectional view of another variation of the planetary gear device according to Embodiment 4.

Further, FIG. 8A is a partial cross-sectional view of planetary gear device 3G according to an exemplary variation of the present embodiment. As illustrated in FIG. 8A, in planetary gear device 3G according to the present variation, the configuration of carrier portion 6G is different from the configuration of carrier portion 6E in Embodiment 4.

Specifically, carrier portion 6G includes guide shaft portion 67 at a distal end portion of first supporting portion 61e. Guide shaft portion 67 extends from the distal end portion of first supporting portion 61e toward second side-plate portion 63E.

The outer diameter of guide shaft portion 67 is slightly smaller than the inner diameter of planetary-side receiving portion 50C of planetary portion 5F. Guide shaft portion 67 is configured so as not to interfere with planetary portion 5F in use.

Figure 8B:
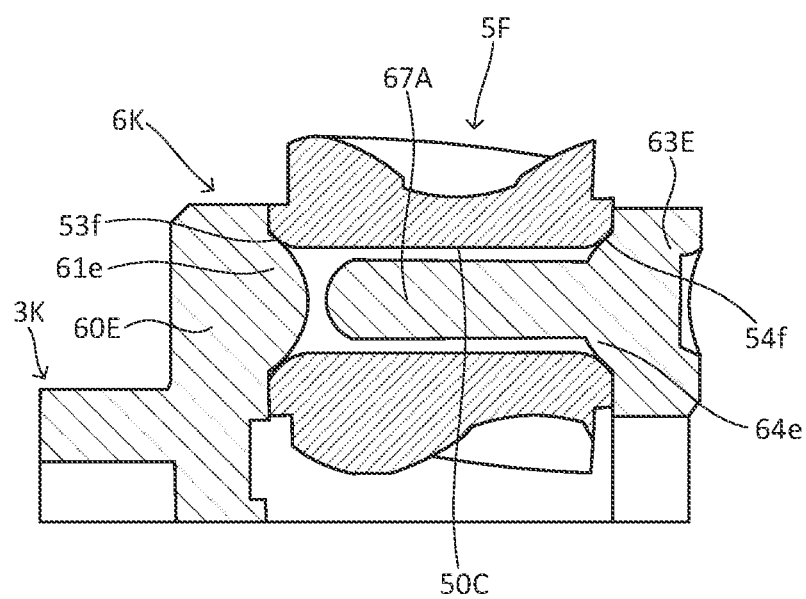
FIG. 8B is a partial cross-sectional view of still another variation of the planetary gear device according to Embodiment 4.

Further, FIG. 8B is a partial cross-sectional view of planetary gear device 3K according to an exemplary variation of the present embodiment. As illustrated in FIG. 8B, in planetary gear device 3K according to the present variation, the configuration of carrier portion 6K differs from the configuration of carrier portion 6G of planetary gear device 3G illustrated in above-described FIG. 8A.

Specifically, in planetary gear device 3K illustrated in FIG. 8B, guide shaft portion 67A is provided at a distal end portion of second supporting portion 64e in second side-plate portion 63E. Further, guide shaft portion 67A extends from the distal end portion of second supporting portion 64e toward first side-plate portion 60E.

Guide shaft portions 67 and 67A as described above contribute to the enhancement of the assembly operation of planetary gear devices 3G and 3K. Specifically, when assembling planetary gear device 3G, the operator inserts guide shaft portion 67 or 67A into planetary-side receiving portion 50C of planetary portion 5F with the distal end of guide shaft portion 67 or 67A facing upward. In this state, guide shaft portion 67 and 67A can avoid coming off of planetary portion 5F. As described above, because coming off of planetary portion 5F during the assembly operation can be avoided, the operator can efficiently assemble planetary gear devices 3G and 3K.

Embodiment 5

Figure 9:
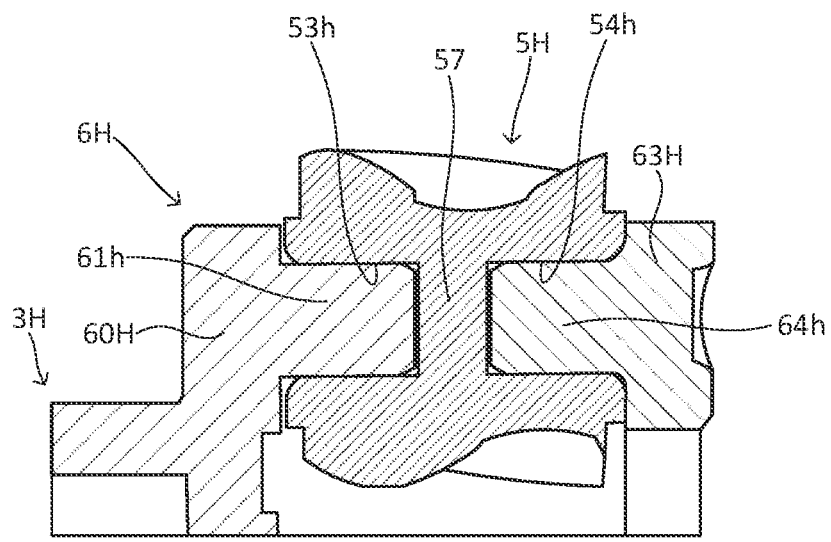
FIG. 9 is a partial cross-sectional view of a planetary gear device according to Embodiment 5 of the present invention.

FIG. 9 is a partial cross-sectional view of planetary gear device 3H according to Embodiment 5 of the present invention. In planetary gear device 3H according to the present embodiment, the configuration of planetary portion 5H and carrier portion 6H is different from the configuration of planetary portion 5 and carrier portion 6 of actuator 1 according to above-described Embodiment 1.

Hereinafter, the configuration different from the configuration of planetary gear device 3 according to above-described Embodiment 1 will be mainly described for the configuration of planetary gear device 3H according to the present embodiment. Because the configurations other than planetary portion 5H and carrier portion 6H are the same as those of planetary gear device 3 according to above-described Embodiment 1, the description of above Embodiment 1 may be used as appropriate.

Planetary portion 5H includes first planetary-side receiving portion 53h on an end surface (also referred to as a first end surface) facing first side-plate portion 60H of carrier portion 6H. First planetary-side receiving portion 53h is formed of a recessed portion provided on the first end surface of planetary portion 5H. First planetary-side receiving portion 53h includes a cylindrical inner surface whose inner diameter does not change.

Planetary portion 5H includes second planetary-side receiving portion 54h on an end surface (also referred to as a second end surface) facing second side-plate portion 63H of carrier portion 6H. Second planetary-side receiving portion 54h is formed of a recessed portion provided on the second end surface of planetary portion 5H. Second planetary-side receiving portion 54h includes a cylindrical inner surface whose inner diameter does not change.

Planetary portion 5H includes web portion 57 having a disk-shape between a bottom portion of first planetary-side receiving portion 53h and a bottom portion of second planetary-side receiving portion 54h in the axial direction. Web portion 57 is a portion that partitions first planetary-side receiving portion 53h and second planetary-side receiving portion 54h in the axial direction.

In other words, web portion 57 is provided at a position interposed between first supporting portion 61h and second supporting portion 64h of carrier portion 6H in planetary portion 5H. Web portion 57 includes a gate mark (not illustrated) at a position corresponding to the gate at the time of injection molding.

Carrier portion 6H includes first side-plate portion 60H, second side-plate portion 63H, a plurality of connecting portions 65 (see FIG. 2A), and output-side shaft portion 66 (see FIG. 2A). The configurations of the plurality of connecting portions 65 and output-side shaft portion 66 are the same as the configurations of the plurality of connecting portions 65 and output-side shaft portion 66 in Embodiment 1.

First side-plate portion 60H corresponds to an example of the first facing portion and has a disk shape. First side-plate portion 60H faces second side-plate portion 63H in the axial direction. First side-plate portion 60H includes first supporting portions 61h at a plurality of positions (three positions in the present embodiment) on the first side surface (the surface facing second side-plate portion 63H) in the axial direction.

First supporting portions 61h are provided at equal intervals in the circumferential direction (intervals of 120 degrees in the present embodiment). First supporting portions 61h are each a shaft member extending from the first side surface of first side-plate portion 60H toward second side-plate portion 63H. The length of first supporting portion 61h is slightly shorter than the length of first planetary-side receiving portion 53h in planetary portion 5H in the axial direction.

First supporting portions 61h each supports planetary portion 5H rotatably on first side-plate portion 60H. First supporting portions 61h are each inserted into first planetary-side receiving portion 53h of planetary portion 5H from one side in the axial direction. The outer peripheral surface of first supporting portions 61h and the inner peripheral surface of first planetary-side receiving portion 53h slidably contact with each other.

Note that, in the present embodiment, first supporting portion 61h is formed of a member integral with first side-plate portion 60H. However, the first supporting portion may be formed of a member separate from the first side-plate portion (that is, the first facing portion). When the first supporting portion is formed of a member separate from the first side-plate portion, the first supporting portion may be fixed to the first side-plate portion by fastening means (e.g., fitting or adhesion).

Second side-plate portion 63H corresponds to an example of the second facing portion and has a circular plate shape. Second side-plate portion 63H is provided on the other side from first side-plate portion 60H in the axial direction. Sun gear 4 (see FIG. 2A) is disposed in a central hole of second side-plate portion 63H.

Second side-plate portion 63H faces first side-plate portion 60H while having a predetermined distance in the axial direction. Second side-plate portion 63H includes second supporting portions 64h at a plurality of positions (three positions in the present embodiment) on the first side surface (the surface facing first side-plate portion 60H) in the axial direction.

Second supporting portions 64h are provided at equal intervals in the circumferential direction (intervals of 120 degrees in the present embodiment). Second supporting portions 64h are each a shaft member extending from the first side surface of second side-plate portion 63H toward first side-plate portion 60H. First supporting portion 61h and second supporting portion 64h are provided on the same line.

The length of second supporting portion 64h is slightly shorter than the length of second planetary-side receiving portion 54h in planetary portion 5H in the axial direction.

Second supporting portions 64h each support planetary portion 5H rotatably on second side-plate portion 63H. Second supporting portions 64h are each inserted into second planetary-side receiving portion 54h of planetary portion 5H from the other side in the axial direction. The outer peripheral surface of second supporting portion 64h and the inner peripheral surface of through hole 50 slidably contact with each other.

Note that, in the present embodiment, second supporting portion 64h is formed of a member integral with second side-plate portion 63H. However, the second supporting portion may be formed of a member separate from the second side-plate portion (that is, the second facing portion). When the second supporting portion is formed of a member separate from the second side-plate portion, the second supporting portion may be fixed to the second side-plate portion by fastening means (e.g., fitting or adhesion).

As described above, in the present embodiment, first supporting portion 61h and second supporting portion 64h are provided in carrier portion 6B.

In planetary gear device 3H having the above-described configuration, web portion 57 in planetary portion 5H includes a gate mark. That is, at the time of injection molding for molding planetary portion 5H, the gate of the injection molding device (not illustrated) is disposed at the position corresponding to web portion 57 of planetary portion 5H. Web portion 57 is disposed at a position close to the center in planetary portion 5H. Thus, during the injection molding, a resin material can be poured with little unevenness into a mold for forming planetary portion 5H. Other configurations, operations, and effects are the same as those of above-described Embodiment 1.

Figure 10:
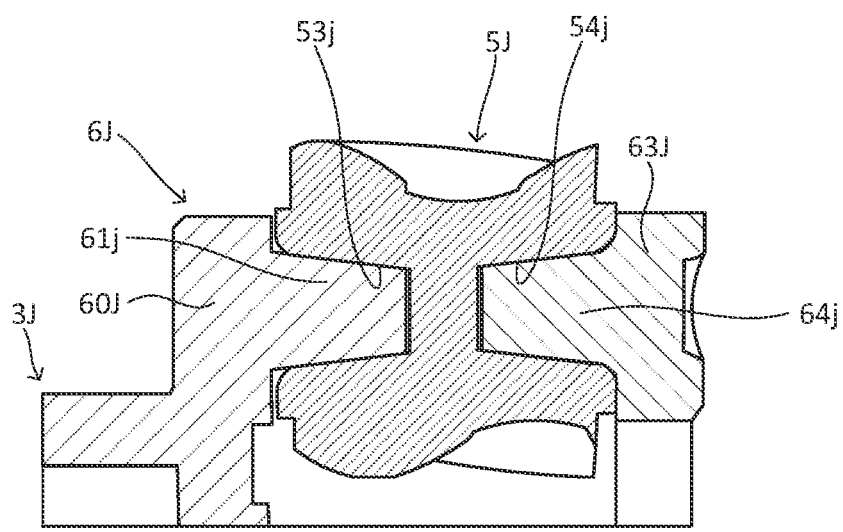
FIG. 10 is a partial cross-sectional view of a variation of the planetary gear device according to Embodiment 5.

Further, FIG. 10 is a partial cross-sectional view of planetary gear device 3J according to an exemplary variation of the present embodiment. As illustrated in FIG. 10, first planetary-side receiving portion 53j and second planetary-side receiving portion 54j of planetary portion 5J are each formed of a recessed portion having a tapered inner peripheral surface (in other words, a tapered surface).

Specifically, first planetary-side receiving portion 53j is formed of a recessed portion whose inner diameter decreases toward the bottom portion. Further, second planetary-side receiving portion 54j is formed of a recessed portion whose inner diameter decreases toward the bottom portion. Other configurations of planetary portion 5J are the same as those of planetary portion 5H according to Embodiment 5.

Further, first supporting portion 61j and second supporting portion 64j of carrier portion 6J are each formed of a shaft member including a tapered outer peripheral surface (in other words, a tapered surface).

Specifically, first supporting portion 61j is formed of a shaft member whose outer diameter decreases toward the distal end portion. Further, second supporting portion 64j is formed of a shaft member whose outer diameter decreases toward the distal end portion.

Also in this variation, first supporting portions 61j each support planetary portion 5J rotatably on first side-plate portion 60J. First supporting portions 61j are each inserted into first planetary-side receiving portion 53j of planetary portion 5J from one side in the axial direction. The outer peripheral surface of first supporting portions 61j and the inner peripheral surface of first planetary-side receiving portion 53j slidably contact with each other.

Second supporting portions 64j each support planetary portion 5J rotatably on second side-plate portion 63J. Second supporting portions 64j are each inserted into second planetary-side receiving portion 54j of planetary portion 5J from the other side in the axial direction. The outer peripheral surface of second supporting portions 64j and the inner peripheral surface of second planetary-side receiving portion 54j slidably contact with each other. Other configurations of carrier portion 6J is substantially the same as the configurations of carrier portion 6H in Embodiment 5.

In the present variation having the above-described configuration, first planetary-side receiving portion 53j including a tapered inner peripheral surface and first supporting portion 61j including a tapered outer peripheral surface slidably contact with each other, and second planetary-side receiving portion 54j including an inner peripheral surface and second supporting portion 64*j* including a tapered outer peripheral surface slidably contact with each other. Therefore, for example, even when carrier portion 6J is inclined with respect to the central axis of carrier portion 6J in use, the influence of such inclination on planetary portion 5J can be reduced. In other words, the tolerance of planetary portion 5J to the inclination of carrier part 6J can be increased. Other configurations, operations, and effects are the same as those of above-described Embodiment 5.

<Additional Remark>

When each member configuring each above-described actuator is made of a synthetic resin, examples of the synthetic resin include polyarylate (PAR), polyacetal (POM), polyamide (PA), polycarbonate (PC), polybutylene terephthalate (PBT), polyether sulfone (PES), polyether ether ketone (PEEK), and polyphthalamide (PPA).

The embodiment of the present invention has been described above. Note that the above description is an example of a preferred embodiment of the present invention, and the scope of the present invention is not limited thereto. That is, the configuration of the device and the shape of each part are merely examples, and it is obvious that various modifications and additions to these examples are possible within the scope of the present invention.

Further, the planetary gear apparatus and the actuator according to the present invention need not include all of the members included in the planetary gear device and the actuator according to the above-described embodiments. The planetary gear device and the actuator according to the present invention may be formed of one or a plurality of members extracted from the planetary gear device and the actuator according to the above-described embodiments.

INDUSTRIAL APPLICABILITY

A planetary gear device and an actuator according to the present invention can be incorporated into various mechanical devices.

REFERENCE SIGNS LIST

1 Actuator
10 Housing
2 Electric Motor
21 Motor Body
3, 3A, 3B, 3C, 3D, 3E, 3F, 3G, 3H, 3J, 3K Planetary gear device
4 Sun gear
5, 5B, 5C, 5D, 5E, 5F, 5H, 5J Planetary portion
50, 50B, 50C Planetary-side receiving portion
52 Planetary-side supporting portion
53*c*, 53*d*, 53*f*, 53*h*, 53*j* First planetary-side receiving portion
54*c*, 54*d*, 54*f*, 54*h*, 54*j* Second planetary-side receiving portion
57 Web portion
6, 6A, 6B, 6C, 6D, 6E, 6F, 6G, 6H, 6J, 6K Carrier portion
60, 60A, 60B, 60C, 60E, 60H First side-plate portion
61*a*, 610*a*, 61*c*, 61*e*, 61*h*, 61*j* First supporting portion
62*b* Carrier-side receiving portion
63, 63B, 63C, 63E, 63H Second side-plate portion
64*a* Carrier-side supporting portion
640*a*, 64*c*, 64*e*, 64*h*, 64*j* Second supporting portion
65 Connecting portion
66 Output-side shaft portion
67, 67A Guide shaft portion
680*a* First bearing hole
681*a* Second bearing hole
9 Output shaft

The invention claimed is:

1. A planetary gear device, comprising:
a carrier portion including a first facing portion and a second facing portion that face with each other;
a planetary portion disposed between the first facing portion and the second facing portion; and
a first supporting portion and a second supporting portion formed on the first facing portion and the second facing portion, respectively, and cooperating with each other so as to support the planetary portion rotatably with respect to the second facing portion, wherein
a tip end of the first supporting portion and a tip end of the second supporting portion are disposed to face each other with a gap therebetween.

2. The planetary gear device according to claim 1, wherein
the gap is formed at a center between the first facing portion and the second facing portion in an axial direction.

3. The planetary gear device according to claim 1, wherein
the first supporting portion and the second supporting portion are formed integrally with the first facing portion and the second facing portion, respectively.

4. The planetary gear device according to claim 1, wherein
the first supporting portion and the second supporting portion are formed separately from the first facing portion and the second facing portion, respectively, and are fixed to the first facing portion and the second facing portion, respectively.

5. The planetary gear device according to claim 1, wherein
the first supporting portion and the second supporting portion are each formed of a shaft portion or a protruding portion, the first supporting portion and the second supporting portion being inserted into the planetary portion, and
the planetary portion includes a first planetary-side receiving portion and a second planetary-side receiving portion that slidably contact with the first supporting portion and the second supporting portion.

6. The planetary gear device according to claim 5, wherein
the first planetary-side receiving portion and the second planetary-side receiving portion are each formed of a through hole or an inner surface of a recessed portion formed in the planetary portion, the through hole formed in the planetary portion.

7. The planetary gear device according to claim 5, wherein
the first planetary-side receiving portion and the second planetary-side receiving portion are each formed of a through hole formed in the planetary portion or a ring-shaped conical surface or a protruding portion formed on an edge of a recessed portion.

8. The planetary gear device according to claim 5, wherein
the first supporting portion includes a guide shaft portion whose outer diameter is smaller than an inner diameter of the planetary portion, and
the guide shaft portion functions as a guide of the planetary portion when the planetary portion is assembled to the first facing portion.

9. The planetary gear device according to claim 5, wherein
- the first planetary-side receiving portion and the second planetary-side receiving portion are each a tapered surface, and
- outer peripheral surfaces of the first supporting portion and the second supporting portion are tapered surfaces fitting to the first planetary-side receiving portion and the second planetary-side receiving portion, respectively.

10. The planetary gear device according to claim 8, wherein
- a length of the first supporting portion in an axial direction is larger than a half of a distance between the first facing portion and the second facing portion, and a length of the second supporting portion in the axial direction is smaller than the half.

11. An actuator comprising:
- the planetary gear device according to claim 1; and
- a motor connected to the planetary gear device and configured to drive the planetary gear device.

\* \* \* \* \*